March 20, 1956     M. C. SANZ     2,739,047
PROCESS OF CHEMICALLY MILLING STRUCTURAL
SHAPES AND RESULTANT ARTICLE
Filed Oct. 30, 1953

*INVENTOR.*
MANUEL C. SANZ
BY *William L. Lane*
ATTORNEY

United States Patent Office 2,739,047
Patented Mar. 20, 1956

2,739,047

PROCESS OF CHEMICALLY MILLING STRUCTURAL SHAPES AND RESULTANT ARTICLE

Manuel C. Sanz, Los Angeles, Calif., assignor to North American Aviation, Inc.

Application October 30, 1953, Serial No. 389,289

10 Claims. (Cl. 41—43)

The present invention is concerned with the chemical milling or etching of formed metallic sheet or stock. The invention specifically contemplates the use of chemical milling or etching in the formation of a mill skin construction or in the making of a stiffened curved structural panel.

In the instant disclosure, the term "mill skin construction" is defined as a construction whereby certain areas of the material, such as aluminum, magnesium, titanium or steel sheet, are milled out thus leaving areas of various thicknesses. Such construction is generally adapted as a weight-saving device, the areas undergoing the least mechanical stress being milled out to divide a thinner section. A mill skin construction may be further said to be a structural panel which has integral stiffening members on the surface thereof.

In the making of a rocket or rocket booster casing using clad 24S–T (aluminum) Heliarc welded, in which a sheet is formed cylindrically and the abutting edges welded, the welds were found to be weaker than the parent material. It was thus suggested that a mill skin construction be made, the areas adjacent the weld zone being thicker than the remaining areas.

The prior process of making mill skins included steps of mechanically milling the sheets either prior to or after the forming operation. When such milling takes place before the forming operation, difficulties of uneven bending, wrinkling, and lack of smoothness arise. Further, the mechanical milling of large formed or unformed sheets is a time-consuming and an expensive procedure.

The present invention alleviates the difficulties of forming premilled sheet by chemically milling the sheet after the sheet has been either rolled or stretched formed. The term "chemical milling" is defined as a process of etching the surfaces to be milled by a chemical attack. As a practical matter, it is not feasible to mechanically mill sheet after such sheet has been formed, due to equipment limitations and great expense. The present invention solves the problem by providing a relatively cheap chemical means of milling the formed sheet.

It is thus a principal object of this invention to provide a chemical method of milling a formed metallic sheet.

A further principal object is to provide a new and novel process for making a mill skin construction.

Another object of this invention is the provision of a process for etching out certain areas of formed metallic sheet.

A further object is to produce a mill skin construction without the difficulties inherent in forming the skin after it has been mechanically milled.

Still another object of this invention is to make a reinforced structural panel which may be assembled with other such panels to make an overall reinforced structure.

A still further object is the provision of a process which may be used for making a mill skin construction in a wide variety of formed shapes and sizes.

Another object of this invention is to provide a process of making a curved stiffened structural panel, said panel being stiffened by integral ribs formed during the etching of said curved panel.

Another object of this invention is to provide a process of milling an aluminum, magnesium, titanium or steel sheet after said sheet has been formed into a variety of formed shapes or curvatures.

Other objects of invention will become apparent from the following description taken in connection with the accompanying drawings, in which Fig. 1 represents a perspective view of a typical mill skin construction;

Figure 7:
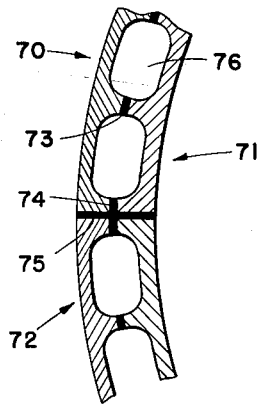

And Fig. 7 is a cross-sectional view of another adaptation of the chemical milling process.

Chemical milling or etching may be done simultaneously on more than one surface and in a wide variety of designs. There is no limitation on the types and sizes of the formed material which may be treated by this process.

The essence of the invention is in chemically milling or etching out the material to be removed after the sheet or skin has been formed. This is accomplished by exposing the desired areas of the sheet to the action of a suitable caustic or other chemical agent. Such caustic attacks the metallic sheet at the exposed areas, resulting in a skin similar to the conventional mill skin. A sodium hydroxide solution is a suitable caustic but other chemical attacking means, such as acids, may be used. The etching process is usually carried out in a tank wherein the formed article is immersed. A formed article completely immersed in a caustic-containing tank will be evenly attacked at the exposed areas, thus forming chemically-milled areas at those points. A vinyl etch-proof film, for example, can be used to protect the areas not to be treated. As alternatives, the surface may be masked by a copper engraving or by a photosensitive gelatin. Still other masking procedures will be apparent to one skilled in the art.

The amount and rate of etching is dependent on various factors, such as temperature, time, caustic concentration and type of starting material. The piece to be treated may be immersed for a set period, removed, washed, pickled, and/or anodized or otherwise surface treated before removal of the film. It will be found that exposed areas of the piece have been evenly attacked. It will be apparent that if attacks of various depths are desired that the sheet may be removed from the etching bath and an additional protective film placed on areas where further attack is not wanted. Further, the formed material may be constantly or intermittently withdrawn from the treatment zone so that various zones of the material will be etched for continuously or intermittently varying periods of time. Thus, it can be seen that tapered skins or sheets can easily be formed by this process.

The term "metallic sheet" is used herein in a broad sense and is meant to include stock or sheets of constant or varying thicknesses and further includes other shapes, such as tubes, bars or rods which are merely sheets or stock formed into hollow or solid form.

Figure 1:
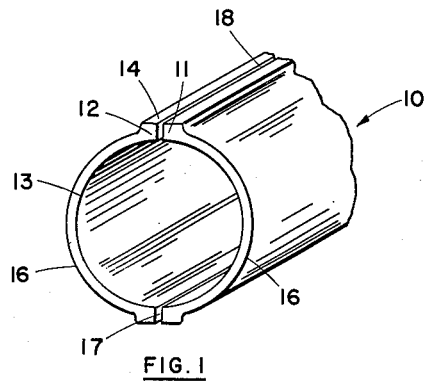

Fig. 1 shows a typical use of the instant process. In the formation of a cylindrical, rocket booster casing 10, an aluminum or aluminum alloy sheet of the thickness shown at 11 and 12 is first formed into a cylindrical shape. The sections 11 and 12 are then joined by an inert gaseous arc welding procedure at 18. Next a protective coating is sprayed, painted, photographically printed, taped or in any manner applied to the inner surface 13 of the casing and to the outer surface 14 of the casing adjacent the weld zone areas which will then be protected from the etching action. It is to be understood that the protective coating may be applied before the forming step since ordinarily the coating is of sufficient elasticity to withstand the forming operation. This is a definite advantage in mass production. The casing 10 is then immersed in a treatment tank where the exposed areas are chemically attacked or etched to the desired depth. The casing 10 is then removed from the tank, water-washed and pickled, if desired. The resultant casing then takes on the appearance of the casing 10 in Fig. 1, the exposed areas being of thinner section as at 16 than the protected areas 11 and 12. In the above treatment the welding step may come after the etching step. If so, the edge portions 17 of the sheet must also be protected from the action of the etching bath.

Figure 2:
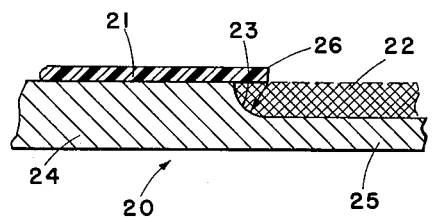
Fig. 2 illustrates the chemical attack at the edge of the protective film.

Fig. 2 illustrates the chemical attack on a sheet 20 in the vicinity of the protective film 21. The etching process removes the area 22 from the sheet 20. The chemical attack at the edge 26 of the film 21 is such that the film is undercut forming a fillet 23 thereunder. The fillet 23 has a radius of curvature corresponding to the depth of etching. After etching the original thickness remains at 24 while a milled out section is present at 25.

Figure 3:
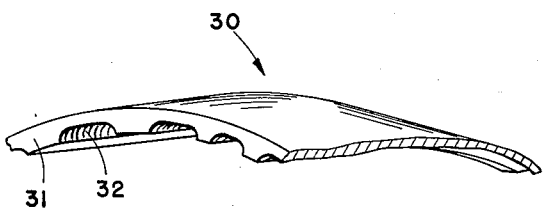
Fig. 3 represents a perspective view of a typical curved structural panel having integral stiffening ribs thereon.

Fig. 3 illustrates a typical curved structural panel made by the instant process. The sheet 30 is first formed into a simple or compoundly curved panel. Before or after this step a protective coating is applied to the exterior surface and to part of the interior surface of the panel. In the instant example elongated sections of film are placed on the interior surface such that integral longitudinal ribs 31 are formed thereon by the subsequent etching process. The areas 32 are etched away leaving the ribs 31. It is to be understood that the ribs 31 need not be longitudinal as illustrated but may be helical, honeycomb or concentric, for example. Furthermore, embossments or lands may be formed on any surface of a formed panel by the instant process. Such embossments or lands might be used to connect interior framing members or cross-struts. An example of a land is seen at 42 in Fig. 4. Such land may have an opening 43 therethrough for use in attaching further members to the construction.

Figure 4:
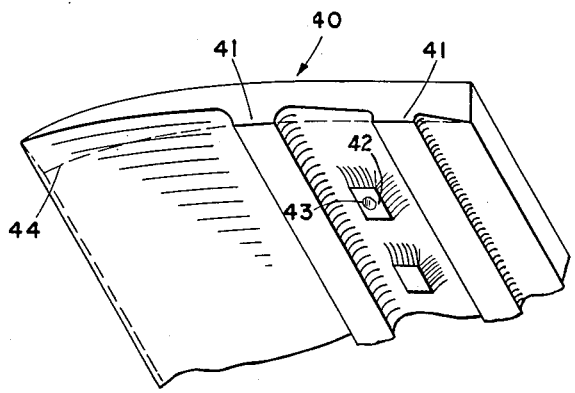
Fig. 4 represents a perspective view of a typical tapered skin or sheet embodying the instant invention.

Fig. 4 shows the present invention as applied to the making of a tapered skin section 40 wherein strengthening ribs 41 are formed on a surface thereof by the etching process. The illustrated skin or sheet can be tapered by slowly withdrawing the skin from the treatment tank while protecting the areas at 41 from chemical attack. The dotted line 44 represents the original thickness of the section 40.

Figure 5:
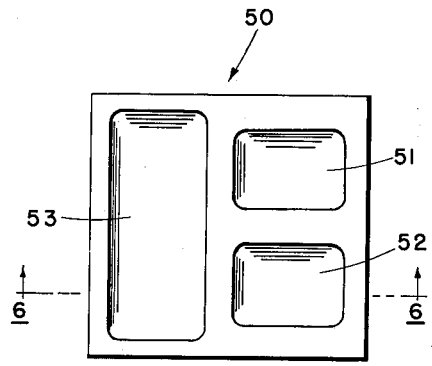
Fig. 5 represents a plan view of a curved structural panel or sheet after the etching process.
Figure 6:
Fig. 6 is a sectional view taken along the line I—I in Fig. 4.

Figs. 5 and 6 illustrate a curved sheet or plate 50 in which the areas 51, 52 and 53 have been etched out forming a light-weight milled sheet or plate. The portions of original thickness remaining act as strengthening members and are adapted for joining with adjacent plates.

Fig. 7 shows a still further adaptation of the chemical milling process. The panel 70 is first formed with the desired curvature after which it is subjected to the etching process which removes the material indicated at 76 and leaves raised portions. Similarly treated panels 71 and 72 are then assembled and joined together as at 73, 74 and 75 after removal of the etch proof film from those areas. The joining may be done by such conventional means as welding, riveting or adhesively bonding with heat or electrical insulative material. It can thus be seen that a cylindrical or other shaped member may be constructed using the various panels. A cylindrical construction, as partially illustrated in Fig. 7, results in a hollow wall section which has approximately 50% less weight than a comparable solid wall section while retaining the advantages of joining thick sections rather than thin skin sections. In Fig. 7, the etched out areas are placed in face-to-face abutting relationship. Such areas form elongated passages suitable for the conduction of coolant fluid.

Advantages of the instant invention are numerous. Tolerances attainable in chemical milling are of the order of ±0.002 inch as against the usual tolerances of ±0.010 inch in mechanical milling. There is no limitation as to size and complexity of design in chemical milling as there is in mechanical milling. A further advantage of the chemical milling process is the extreme ease in forming various configurations on the surfaces to be treated. For example, load distribution patterns in the form of stiffeners can be easily formed integrally on sheet surfaces by the aircraft load designer. The process further permits a simplified cheap process of construction eliminating many riveting, seam welding and spot welding joining methods. Further, the chemical process of milling is one which may be more easily and accurately controlled. Also, with the elimination of much riveting and a multiplicity of joints a structure having a greater degree of liquid tightness is possible. Further, a great number of formed sheets may be treated in a single tank in one operation.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The method of producing a high strength-to-weight ratio thin-walled metal panel structure with predetermined raised integral reinforcing areas on a surface of said structure as required for load distribution through said structure, comprising first forming to a desired contour a metal sheet of a thickness substantially equal to the thickness desired at said raised areas, masking peripheral edge portions of a surface of said sheet and areas on said surface within said peripheral edge portions in a predetermined pattern required for said load distribution, and etching the remaining areas of said surface to a uniform depth equal to the difference between the thickness of said sheet and the minimum thickness desired for said thin-walled panel structure.

2. The invention as set forth in claim 1 in which said masked portions extend from one peripheral edge portion to another.

3. The invention as set out in claim 1 in which portions of said remaining areas are etched for continually varying times, whereby tapered areas are produced in said portions of said remaining areas.

4. The invention as set out in claim 1 including the further step of joining said panel structure at a peripheral edge portion thereof with a peripheral edge portion of a structural member.

5. The invention as set out in claim 1 in which the last mentioned etching step includes etching said remaining areas to various depths.

6. The invention as set out in claim 1 in which said minimum thickness is a minor fraction of said sheet thickness.

7. The invention as set out in claim 1 in which said sheet is first formed into a compound curvature.

8. A thin-walled high strength-to-weight ratio structural panel comprising a metal sheet formed into a desired configuration, load distributing integral raised reinforcing portions of metal on a surface of said sheet and an etched out area on said surface around said raised portions, the thickness of metal remaining in said etched out area being such as to provide a substantially improved strength-to-weight ratio for said panel.

9. An article as recited in claim 8 in which said desired configuration has a compound curvature.

10. The method of producing a high strength-to-weight ratio thin-walled metal panel structure with predetermined raised integral reinforcing areas on a surface of said structure as required for load distribution to said structure comprising first forming to a desired contour a metal sheet of thickness substantially equal to the thickness desired at said raised areas, masking portions of a surface of said sheet in the predetermined pattern required for said load distribution, masking the entire opposite surface of said sheet, and etching the remaining areas of said surface to a uniform depth equal to the difference between the thickness of said sheet and the minimum thickness desired for said thin-walled panel structure.

References Cited in the file of this patent

UNITED STATES PATENTS

| | | |
|---|---|---|
| 1,804,024 | Nicolas et al. | May 5, 1931 |
| 2,157,845 | Bernarde | May 9, 1939 |
| 2,312,451 | Strike | Mar. 2, 1943 |
| 2,341,293 | Rives | Feb. 8, 1944 |
| 2,517,430 | Hensel et al. | Aug. 1, 1950 |